H. SEIDLER.
PROCESS OF MANUFACTURING BIMETALLIC COMPOSITE OBJECTS OR BODIES.
APPLICATION FILED AUG. 16, 1915.

1,168,752.  Patented Jan. 18, 1916.

Inventor:
HUGO SEIDLER,
By John H. Bruninga.
His Attorney.

UNITED STATES PATENT OFFICE.

HUGO SEIDLER, OF BERLIN-DAHLEM, GERMANY.

PROCESS OF MANUFACTURING BIMETALLIC COMPOSITE OBJECTS OR BODIES.

1,168,752.   Specification of Letters Patent.   Patented Jan. 18, 1916.

Application filed August 16, 1915. Serial No. 45,743.

*To all whom it may concern:*

Be it known that I, HUGO SEIDLER, a citizen of the German Empire, and residing at Berlin-Dahlem, Germany, have invented a certain new and useful Improved Process of Manufacturing Bimetallic Composite Objects or Bodies, of which the following is a specification.

My invention relates to the manufacture of compound castings or objects composed of copper or the like and iron or the like.

It has hitherto been attempted to cause copper to adhere to iron or steel by applying it in a molten condition to the iron or steel body and then heating both to the melting point of steel. A permanent connection of the two metals has, however, not been obtained by this process. This lack of success is to be attributed to the copper not being applied under high pressure to the iron or steel. In the improved process according to my invention this pressure is produced by enveloping with liquid copper the iron or steel bodies which are to be connected at some places with copper, heating the same to the welding temperature of iron or steel and then slowly cooling the same. As the copper contracts more than the iron or steel body the latter is subjected during the cooling operation to such severe pressure that the welding of the copper to the iron or steel is brought about very effectively. The described process prevents relative displacement of the contacting surfaces of the copper and iron or steel, whereby intimate connection of the different metals is possible. Since the copper when shrinking cannot shift relatively to the iron or steel body, the very high pressure due to the shrinkage is used for pressing the copper shell onto the iron or steel body during the entire welding operation.

To these ends the invention consists in the operations described hereinafter and pointed out in the claims.

One form of apparatus adapted for carrying the improved process into practice is represented by way of example in the accompanying drawing, wherein:—

Figure 1:
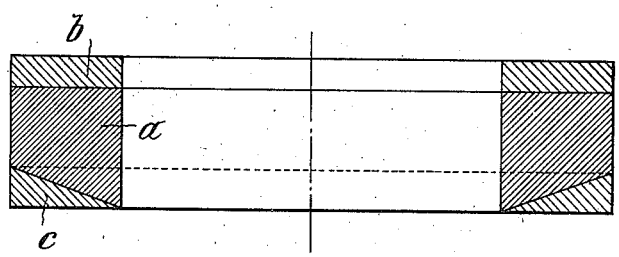
Figure 2:
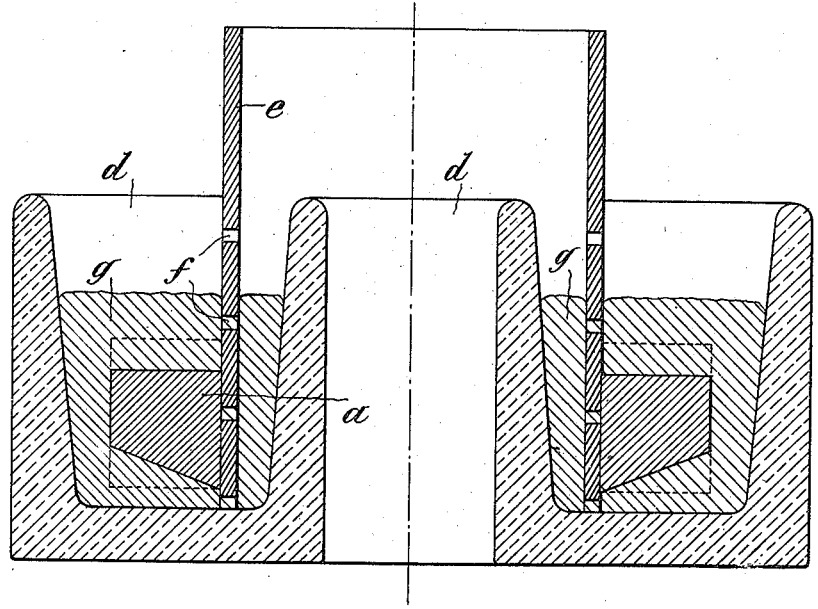

Figure 1 is a sectional elevation of an annular body to be made by the improved process, and Fig. 2 is a like view of a crucible in which such a body can be made.

Referring to the drawing, the annular body shown in Fig. 1 consists of a steel ring *a* and two copper rings *b* and *c* welded onto the top and bottom thereof.

In carrying the process into practice the ring *a* is put into the fireproof crucible *d* shown in Fig. 2. In order to hold the ring in position and to prevent its shifting when the molten copper is poured in, the ring is placed on a holder or tube *e*. The tube with the ring thereon is now placed in the mold and the copper poured around the same. This tube *e* has perforations *f* through which the molten copper *g* flows in order to envelop or surround the ring on all sides. The crucible is then heated, preferably while the copper is still in molten condition, to the welding temperature of iron or steel and then slowly cooled. When the copper shrinks, such a high pressure is imposed on the iron or steel ring *a*, which latter is still at the welding temperature, that the two metals are permanently and intimately connected and welded together.

In order to facilitate the removal of the contents of the crucible the latter is preferably made conical, and after the contents have cooled and have been removed, the composite body is turned down to the shape shown in Fig. 1; a compound ring is thereby obtained, in which the copper portions *b* and *c* are so intimately connected to the iron or steel core *a* that the union resists even the roughest mechanical treatment. The provision of the perforations *f* in the tube *e* through which perforations the copper flows, in effect causes the copper to completely envelop the steel, in that it causes a complete ring of copper around the steel, so that cooling will cause the shrinking ring of copper to closely hug the steel and force the steel and copper into intimate contact. By means of correspondingly designed crucibles copper can be applied to larger surfaces of iron or steel bodies in a similar manner.

Although the improved process has been described with reference to the manufacture of an annular body, it is to be understood that the invention is not limited to bodies of such a shape, but may be employed in manufacturing bimetallic compound bodies of the type described of other shapes.

I claim:—

1. A process of manufacturing bimetallic composite bodies, comprising enveloping a body composed of the one metal with the other metal in a molten state, heating the same to the welding temperature of the said body metal, and gradually cooling the same, whereby the said molten metal is solidified, contracts, subjects the enveloped body to high pressure and is intimately united with the same, substantially as described.

2. A process of incasing a metallic body with another metal having a lower melting point, comprising pouring the molten metal of lower melting point around all sides of the body metal, heating the same to the welding temperature of the body metal, and gradually cooling the same, whereby the molten metal is solidified, contracts, exercises high pressure on the heated body and is intimately united therewith.

3. A process of covering the top and bottom of a metallic body with another metal of lower melting point, comprising mounting the body on a hollow, cylindrical, perforated member, surrounding the body on all sides with the said metal of lower melting point in a molten state, heating the same to the welding temperature of the said body, gradually cooling the same, whereby the said molten metal is solidified, contracts, subjects the body to high pressure and is intimately united with the top, bottom and outer periphery of the same, removing the body covered with metal from the said member, and removing the covering metal from the outer periphery of the body, substantially as described.

4. A process of manufacturing composite metal objects, comprising applying a metal in molten condition to a solid body of higher melting point, heating the object to the welding temperature of the body metal, and cooling the object so as to cause pressure to unite the metals.

5. A process of manufacturing composite metal objects, comprising incasing a core with a metal of a lower melting point, heating the object to the welding temperature of the core metal, and cooling the object so as to cause pressure to unite the metals.

6. A process of manufacturing composite metal objects, comprising casting a metal around a core of a higher melting point, heating the object to the welding temperature of the core metal, and cooling the object so as to cause pressure to unite the metals.

In testimony whereof, I affix my signature in the presence of two witnesses.

HUGO SEIDLER.

Witnesses:
WOLDEMAR HAUPT,
HENRY HASPER.